INVENTOR.
EDWARD CADWELL
ATTORNEY.

Feb. 24, 1953

E. CADWELL 2,629,410

ELECTRIC POWER HANDSAW JIG

Filed Sept. 15, 1950

INVENTOR.
EDWARD CADWELL
BY
ATTORNEY

Patented Feb. 24, 1953

2,629,410

UNITED STATES PATENT OFFICE 2,629,410

ELECTRIC POWER HANDSAW JIG

Edward Cadwell, University City, Mo.

Application September 15, 1950, Serial No. 184,919

2 Claims. (Cl. 143—47)

My invention relates to an electric power hand saw jig.

The primary aim and object of the present invention is to overcome certain practical objections to, and defects in, cutting rafters and all dimensional lumber such as making a cut with an electric power hand saw in a direct path transverse, or oblique to the length of the lumber or providing a groove in a piece of lumber by dadoing.

An object of the invention resides in the provision of an electric power hand saw jig of the simplest mechanical construction.

Another object of the invention is to provide a jig for slidably supporting an electric power hand saw for cutting rafters and all dimensional lumber as to length.

A further object of the invention is to provide a jig which will save carpenters time in cutting a large number of boards, such as rafters and the like, and increase accuracy as to lengths of the boards cut.

A further object of the invention is the provision of a device of the character which will be light in weight, conveniently carried about with other carpenter tools, and which may be removably secured to a suitable support readily accessible on any job.

Other objects and advantages of the invention will be apparent during the course of the following description.

In the accompanying drawings forming a part of this application, and in which like numerals are employed to designate like parts throughout the same:

Figures 1, 2:
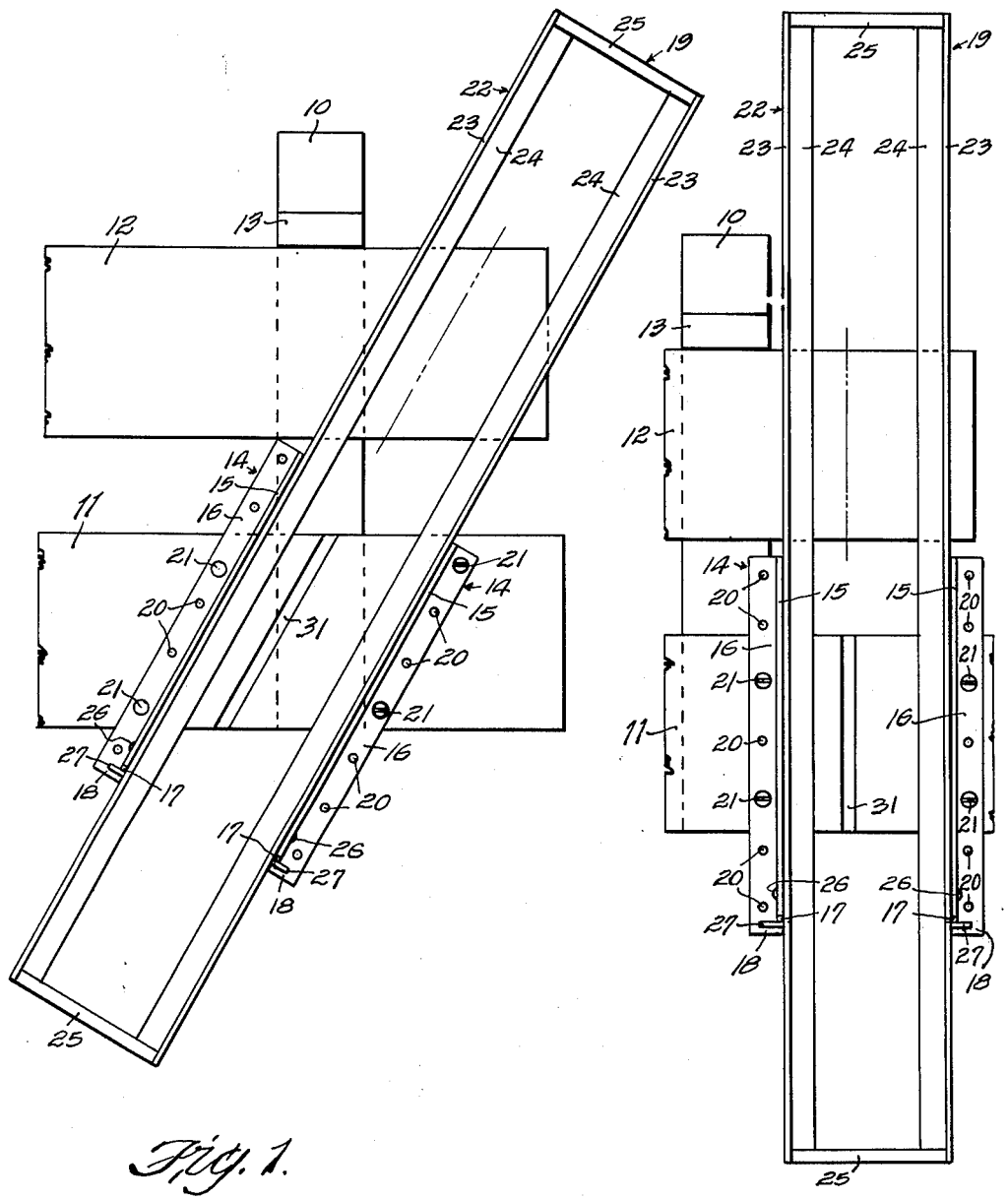
Fig. 1 is a top plan view of an electric power hand saw jig secured to a support, and embodying the features of my invention, the jig being positioned to allow a saw cut obliquely across a board.
Figure 2 is a view similar to Fig. 1, showing the jig positioned on a support to allow a saw cut transversely across a board.

In the drawings, wherein for the purpose of illustration, the reference character 10 designates a suitable sawhorse, trestle, or similar structure for supporting a suitable board 11 of desired thickness. The board 11 is secured to the top of the trestle to prevent displacement thereof relative to the trestle. While only one trestle is shown, it is clearly apparent that two trestles may be employed so as to support each end of the board 11, and also to support the board to be cut to length, which board is designated 12. The trestle 10 is provided with a guide stop 13 to position the board in parallel relation with the board 11 during the cutting operation, as clearly shown in Figs. 1 and 2 of the drawings.

The jig for supporting and guiding the manually moved electric power hand saw, is supported by the above described trestle and board structure, and the jig structure and its operation will now be described.

Figure 4:
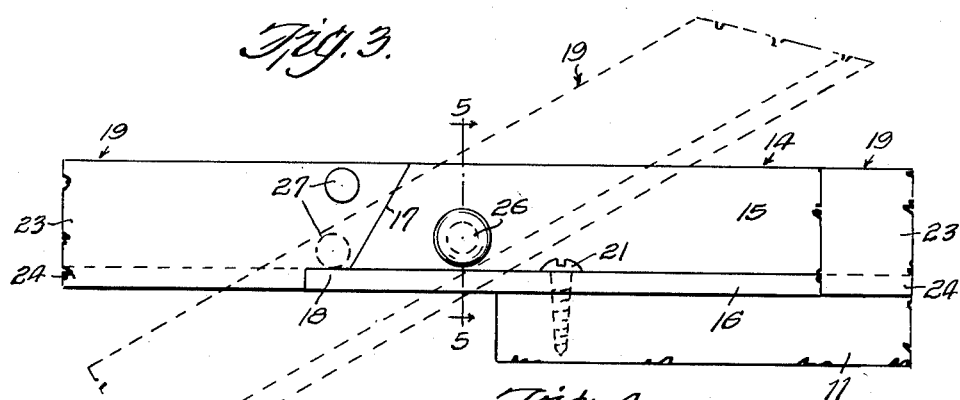
Fig. 4 is a fragmentary view, in side elevation, of one end of the device.

The jig includes a pair of spaced apart parallel arranged frame supporting members designated, generally, as 14, of suitable length, as clearly shown in Figs. 1 and 2. Each member 14 has a vertical wall 15 and an outwardly projecting base flange 16. One end of each vertical wall 15 is cut away at an angle, as shown in Fig. 4, as at 17, to provide a pair of opposed spaced stop shoulders 18 on the projecting ends of the base flanges 16. The jig also includes a rectangular saw supporting frame designated, generally, as 19, which is tiltable with relation to the base members 14, and upon which supporting frame an electric power hand saw is adapted to be slidably mounted to perform the cutting operations on the piece of lumber 12.

The frame supporting members 14 have their base flanges 16 provided with a series of openings 20 through which fastening devices such, for instance, as screws 21, may pass to be anchored in the board 11. The members 14 may be removably secured to the board 11 at any desired angle to the side edges thereof, as disclosed in Figs. 1 and 2, dependent upon whether the board 12 is to be cut in a direct path transverse, or oblique to the length of the board.

The electric power hand saw supporting frame designated, generally, as 19, includes a pair of spaced apart, parallelly arranged side members designated, generally, as 22. Each side member 22 has a vertical wall 23 and an inwardly projecting base flange 24. Suitable end members 25 are suitably secured to the ends of the side members 22 to provide a saw supporting frame structure that will be light in weight, yet rigid and rugged in its structure so as not to be easily warped, or twisted out of shape. The side members 22 are preferably, although not necessarily, made from pieces of angle iron, or its equivalent, so that the inwardly projecting base flanges 24 may serve as slides, or supports for an electric power hand saw to be manually moved back and forth thereon.

Figure 3:
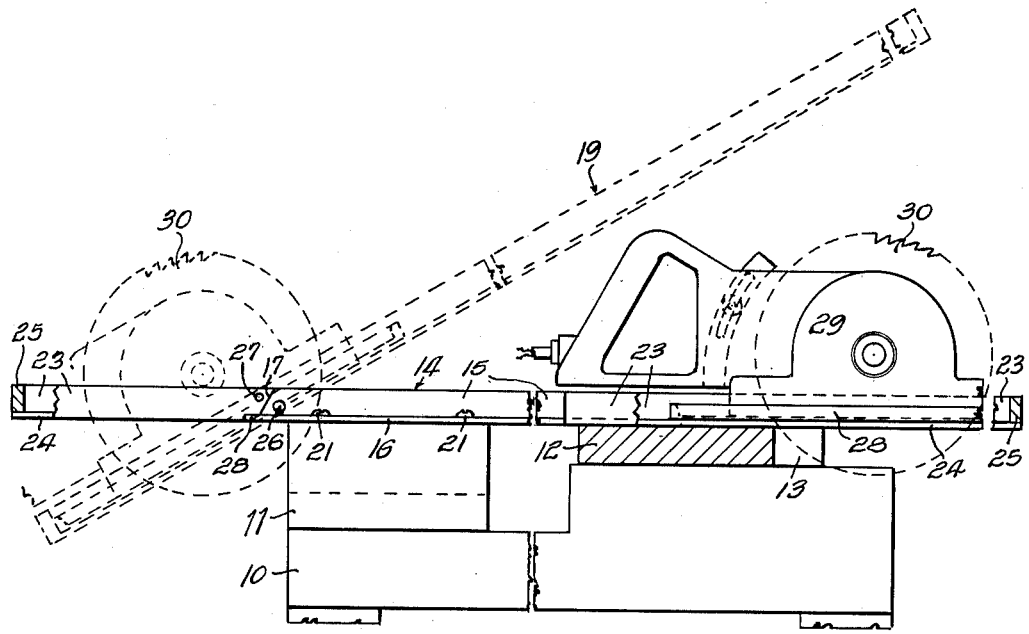
Fig. 3 is a side elevation of the jig and a support therefor and a board to be cut.
Figure 5:
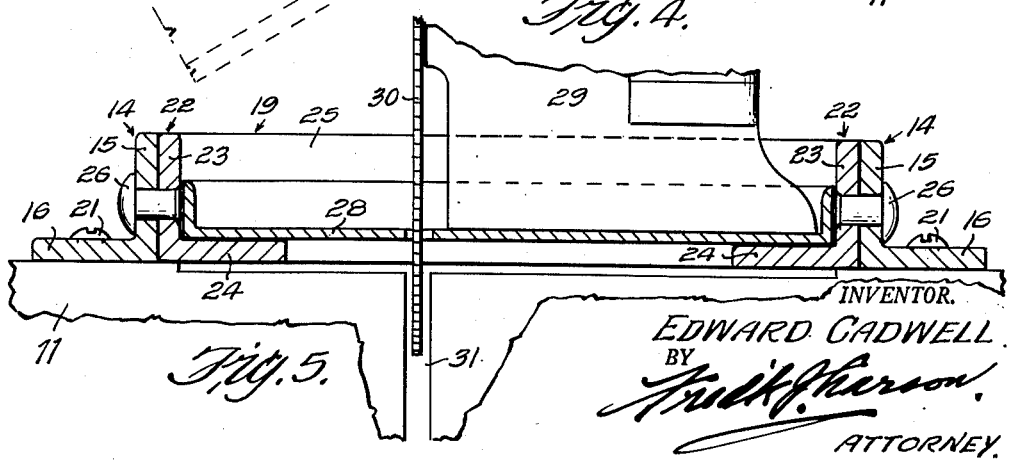
Fig. 5 is a transverse sectional view of the device taken on line 5—5 of Fig. 4.

The vertical walls 23 of the side members 22 of the saw supporting frame designated, generally, as 19, are hingedly riveted near one end thereof and adjacent the stop shoulders 18 to the vertical walls 15 of the frame supporting members 14 by means of suitable rivets 26, as clearly shown in Figs. 4 and 5. The saw supporting frame 19 is hingedly positioned between the frame supporting members 14, as clearly shown in Fig. 5. This arrangement allows the saw supporting frame 19 to be tilted to a predetermined angle, from a horizontal position, as shown in Figs. 3 and 4, to the dotted line positions shown in Figs. 3 and 4. When the saw supporting frame structure 19 is in its horizontal solid line position, which is its cutting position, the stop shoulders 18 at one end of the stationary side members 14 will be engaged by stop pins 27 projecting outwardly from the vertical walls 23 of the side members 22 of the saw supporting frame 19, which limits the tilting movement of the frame 19. When the saw supporting frame 19 is in its horizontal solid line position, part of the frame rests upon the jig supporting board 11 and the outer free end portion of the frame 19 rests upon the board 12 to be cut by the circular blade of the saw when the saw is manually moved toward the outer free end of the saw supporting frame 19, as illustrated in Fig. 3.

The electric power hand saw is of the conventional type and includes a base plate 28, motor 29 and the circular saw blade 30. The base plate 28 of the hand saw engages and slides upon the inwardly projecting base flanges 24 of the side members 22 of the saw supporting frame 19.

When the electric power hand saw is moved to the extreme left end of the saw supporting frame, the weight thereof automatically tilts the frame into its inclined position, thus raising the frame 19 from engagement with the cut board 12 which allows the cut board 12 to be quickly removed and another board 12 placed in position to be cut without the frame 19 in any way interfering with the removal of the cut board, or the positioning of the said other board 12.

The board 11 which supports the jig may have a groove 31 in its upper face to receive the saw blade when it is moved to the left end of the saw supporting frame 19, which cut or groove 31 is deep enough to allow the saw blade 30 to cut completely through the board 12.

The conventional electric power hand saws are adjustable so that the saw blade may be set to cut any depth of a groove made by dadoing.

The many advantages of the herein described invention will readily suggest themselves to those skilled in the art to which it appertains.

It is to be understood that the form of my invention herein illustrated in the drawings and described, is to be taken as a preferred example of the same, and that various changes in the shape, size and arrangement of the parts may be resorted to, without departing from the spirit of my invention or the scope of the appended claims.

What I claim is:

1. In a sawing device, a saw-horse, a supporting member supported at one end of ridge bar of the saw-horse, a stop at the opposite end of the saw-horse adapted to guide a board placed on the opposite end of the saw-horse to be cut to length, a straight track structure adapted to support a portable power driven circular hand saw for back and forth movement thereon, means for pivotally supporting the track in advance of the front edge of the supporting member to provide a short length of track in advance of the supporting member and a relatively longer length of track to overlie the supporting member and the work piece to be cut to length by means of the saw when moved to saw cuttting position on the track above the work piece, and said track adapted to be moved to an inclined position by the weight of the saw when it is moved to a non-sawing position on the track in advance of the front edge of the supporting member.

2. In combination with a saw-horse and a portable power driven circular hand saw, a supporting member having an upper facial saw-cut supported at one end of the saw-horse, a stop at the other end of the saw-horse for guiding a work piece placed therein to be cut to a predetermined length, spaced parallel arranged right angular shaped members attached to the upper face of the supporting member with one on either side of the saw-cut, said angle members projecting beyond the forward edge of the supporting member adjacent the end of the saw-horse carrying the supporting member, a rectangular frame structure serving as a straight track for slidably supporting the hand saw and guiding the saw in its movements thereon, the far end portion of the frame resting on the work when cutting the work to lengths, means for pivotally connecting the forward end portion of the rectangular frame to the forward projecting ends of the angle members in advance of the front edge of the supporting member to allow a short portion of the frame to project beyond the forward ends of the angle members so that when the saw has been moved from its work cutting position at one end of the frame to its non-cutting position at the opposite end of the frame the frame will be automatically inclined, by the weight of the saw, on the forwardly projecting end of the frame to lift the opposite end of the frame from the work to allow new work to be supported by the saw-horse.

EDWARD CADWELL.

REFERENCES CITED

The following references are of record in the file of this patent:

UNITED STATES PATENTS

| Number | Name | Date |
|---|---|---|
| 1,832,283 | Earhart | Nov. 17, 1931 |
| 2,188,827 | Bradfield | Jan. 30, 1940 |
| 2,502,640 | Coleman | Apr. 4, 1950 |
| 2,527,754 | McDermett | Oct. 31, 1950 |
| 2,556,137 | Emmons | June 5, 1951 |

FOREIGN PATENTS

| Number | Country | Date |
|---|---|---|
| 321,749 | Great Britain | Nov. 21, 1929 |